March 3, 1959     K. SCHENK     2,876,099
LENS SCREEN AND METHOD OF MAKING THE SAME
Filed Aug. 18, 1953
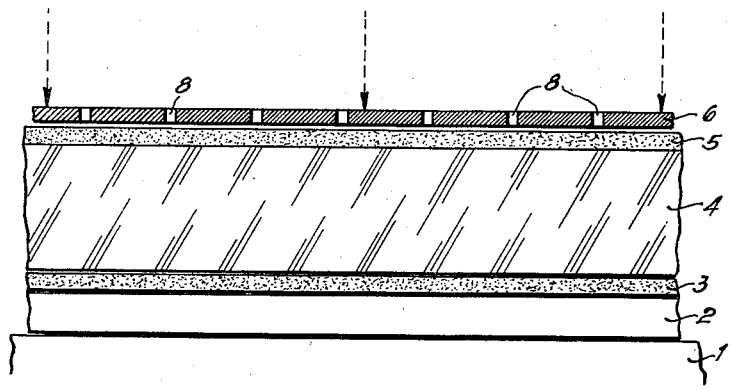
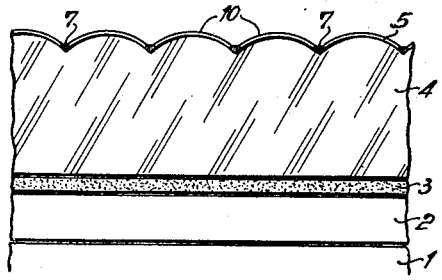
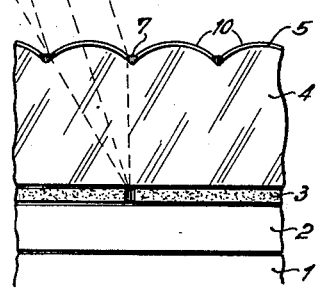
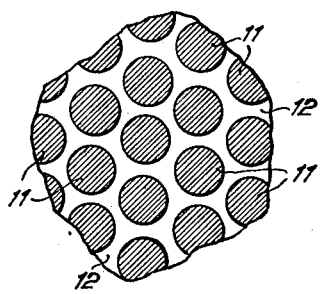
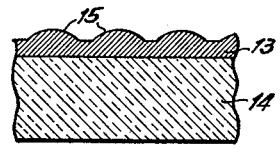
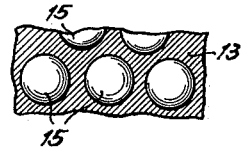
INVENTOR
Karl Schenk United States Patent Office 2,876,099
Patented Mar. 3, 1959

2,876,099

LENS SCREEN AND METHOD OF MAKING THE SAME

Karl Schenk, Munich, Germany, assignor to Georg Hieber, Munich, Germany

Application August 18, 1953, Serial No. 374,905
In Germany March 17, 1949

Public Law 619, August 23, 1954
Patent expires March 17, 1969

24 Claims. (Cl. 96—45)

The present invention relates to a lens screen as used for instance in the manufacture of plastic pictures, particularly for the exposure—or copy—material. Such screens may be used also in the reproduction technique for instance in the autotype, in the printing of books, or the like for the purpose of distribution of the points of the picture-elements. These applications are mentioned by example only and not as a limitation of the present invention.

While in ordinary flat screens the parallel or crosswise disposed lines are arranged in the same plane with the screen elements, the surfaces of lens screens are formed three-dimensional and in particular convex. In many cases the surfaces of the individual screen elements are curved like a lens, which is the reason for calling them "lens screens." Yet, lens screens are also known in which the individual elements, similar to a two-dimensional line screen, extend through the entire length or the entire width of the screen and, thus, assume the shape of cylinder segments for instance of half-cylinders.

It is an object of the present invention to provide lens screens which are produced by photochemical means.

It is another object of the present invention to provide a lens screen which comprises a transparent or non-transparent carrier having a layer of material capable of swelling, into which the lens screen is worked in by means of exposure and after treatment as tanning.

In cases where the lens screen is prepared for the reproduction technique, it is yet another object of the present invention to provide in general a transparent carrier, particularly glass or in some instances a leaf of artificial resin, on which is directly disposed a layer capable of swelling, which is provided on its upper face with lens screen elements by means of exposure and after treatment as tanning.

In cases where the lens screen is prepared by example for exposure-material or copy-material, as used particularly for plastic pictures, it is still another object of the present invention to provide a carrier which may be non-transparent and of paper in this case, on which carrier a light-sensitive layer is disposed, and on the latter a layer of material capable of swelling into which the lens screen is worked in by means of exposure and after treatment as tanning.

It is also another object of the present invention to provide a device as defined in the last mentioned object which includes, however, an intermediate layer, between the carrier and the light-sensitive layer, which intermediate layer smooths the surface, which expedient is particularly advisable if paper is used as the carrier, the smoothing layer being by example baryta or sulphate of barium, which has in addition a reflecting effect in the production of non-transparent pictures, and an opalescent effect in the production of transparent pictures.

It is a still further object of the present invention to provide a device of the stated character, in which the layer capable of swelling consists in the first place of gelatine, which is transformed into the lens screen relief by means of exposure and following watering, which relief remains after drying and is fully effective.

It is also a further object of the present invention to provide a device of the stated character in which the screen elements have the form of cylinder segments or half cylinders in the use for exposure material or copy material for instance for plastic pictures.

It is yet a further object of the present invention to provide a device of the stated character in which it is of advantage to form the elements of the lens screen as points for instance circular, triangular or square, in its use for the reproduction technique.

It has been found that the lens screens, particularly the point lens screens in accordance with the present invention, are of greater light intensity compared with the line screens or cross-line screens used for the same purpose, that means that the overwhelming part of the passing light is used for the formation of the picture. In addition they are sharper in their points compared with the known cross-line screens, which means that they deliver sharply outlined picture points.

The manufacture of the lens screen in accordance with the present invention is achieved in such manner that a layer of material capable of swelling as for instance gelatine is disposed on a transparent or non-transparent carrier which may also carry a smoothing layer, the layer of material capable of swelling being sensitive or being made sensitive later, whereupon the latter layer is exposed through the medium of a screen which in turn may likewise be a lens screen, to bring about the division corresponding with the lens screen to be achieved, and then developed and dried. If bichromate, for instance a water solution of bichromate of ammonium or bichromate of potassium, for making the gelatine sensitive, is used, merely watering is necessary after the exposure, in order to develop the screen relief.

In one embodiment of the present invention the layer of material capable of swelling is either made light sensitive on its surface or covered with an additional light sensitive emulsion layer. It is, however, also possible to add an emulsion of halogen-silver to the gelatine solution before applying it to the carrier. After the exposure through the medium of a screen which has a division corresponding with the lens screen to be formed, watering is sufficient if appropriately chosen sensitivity matter is used; under given conditions it is possible to develop shortly and to treat afterwards, whereupon after appropriate watering the lens screen plate is dried.

With these and other objects in view which will become apparent in the following detailed description, the present invention will be clearly understood in connection with the accompanying drawings, in which Figure 1 shows a section through the carrier with the required layers applied thereto to demonstrate its light exposure;

Fig. 2 is a section through the finished lens screen;

Fig. 3 shows the optical copying of a picture point through the lens screen layer onto the picture layer;

Fig. 4 is a plan view of a screen adapted for the production of a point shaped lens screen, which screen may by example be disposed in a plane;

Fig. 5 is a section through the lens screen formed by the screen shown in Fig. 4; and Fig. 6 is a plan view of the lens screen shown in Fig. 5.

Referring now to the drawings and in particular to Fig. 1, a carrier 1, for instance of paper, has a layer 2 which is adapted to smooth the surface of the carrier 2. Copy paper usually used in black-and-white photography may be used as carrier. A light-sensitive layer of silver halide 3 is disposed over the baryta layer 2 for the picture points, which layer 3 may be by example of a thickness of $20\mu$. On the layer 3 is disposed a layer 4 of gelatine of a thickness of about 150μ. The latter carries a relatively non-sensitive layer 5 of fine grained silver halide, which is by example of a thickness of 20μ. The layer 5 is not necessarily a separate layer. It is also possible to admix to the gelatin layer 4 a silver halide emulsion. In order to produce the screening, a screen 6 of known structure, the division of which lens screening corresponds reversely with the lens screening to be formed, since the screen 6 constitutes a negative of the formed lens which thus has for instance elements of a width of 50μ, is disposed on the layer 5 and 4, respectively.

The material is treated before its exposure with a matter rendering the material sensitive for instance with a solution of bichromate of ammonium or of bichromate of potassium. It is of course also possible to add to the layer 5 and/or 4 such matter rendering the material sensitive before it is poured on. The sensitiveness brings about the effect that the gelatine layer operates as light filter during the following copying of the lens screen, so that the light sensitive layer 3 is protected from the light rays which create the lens screening in the layer 4.

The bichromate, mentioned by example as sensitizer, may be replaced by other sensitizers, which are known for the purpose of after treatment of the gelatine as gelatine tanning. Generally chromate compounds are preferably used for this purpose. It is possible also to use by example chromate of potassium or calcium chromate. Instead of gelatine another suitable colloid may be used, by example a regenerated cellulose or cellulose-hydrate which are known on the market as "Cellophane" or "Heliozell." It is important only that the chosen colloid may be poured to a layer on a photographic carrier, that it is transparent and that it may be subjected to after treatment as tanning by means of light.

As stated above, the bichromate has, in addition to rendering the gelatine layer sensitive, the effect that it protects the light sensitive layer 3, into which upon formation of the lens screen the picture points are copied, during the exposure of the sensitive gelatine layer from the light rays. If desired, this protective effect may still be enhanced by providing a light filter layer between the silver halide layer 3 and the gelatine layer 4, which light filter layer may contain by example such color material which is used for photographic material for the protecting layer against the formation of light spots. This particular layer is removed again after exposure of the gelatine by example during the development step or during the watering step or by any other suitable particular means, before the formation of picture points in the light sensitive layer 3 is to be achieved. When the material rendering sensitive the gelatine layer 4 does not operate simultaneously as protecting light filter for the silver halide layer 3, the provision of the mentioned light filter layer is necessary.

The light-sensitive layer 5 of low sensitivity which is either disposed above or mixed into the gelatine layer 4 serves the purpose to provide a non-transparent line at the joint of the individual lens elements (see Figs. 2 and 3). If the silver halide emulsion is omitted, the same relief as tanning-relief would be formed after exposure and tanning through the medium of the screen 6, which would also have a sharp focus, as indicated in Fig. 3, but the joints 7 would remain transparent, because the joints 7 between the lenses have a confined measurement in accordance with the clear transparent screen lines 8 of the screen 6, and thus dispersed light would reach the layer 3 during the copying of the picture elements 9 and, thereby, lead to a veil-formation.

In order to avoid this drawback, the silver halide emulsion is provided. Since, however, the exposure of the gelatine layer 4 for the after treatment as tanning in the formation of the lens screen is about 100 times greater in the gelatine rendered sensitive by means of bichromate as that for the blackening of a normal silver halide layer, it is advisable to render extremely insensible against light the silver halide layer 5 and the admixture of silver halide to the layer 4, respectively, because its low sensitivity is sufficient to produce a latent blackening during the very long after treatment exposure as tanning exposure, which blackening leads to the black joints 7 after the usual development. If a silver halide layer of normal sensitivity would be used, this layer would cast a complete veil over the entire surface of the screen during the 100-times exposure of the gelatine layer 4.

Upon exposure of the screen plate, as indicated in Fig. 1 the matter rendering the material sensitive, by example chromate of ammonium or chromate of potassium is watered out, whereupon the latent picture of the screen lines 7 is developed in the silver halide layer 5. It is preferred to use a developer which simultaneously has an after treatment effect as tanning effect on the gelatine layer 4. Experience shows that the after treatment effect, namely the tanning effect, is particularly greater on those spots in which much silver has been reduced. Pyrogallol and pyrocatechin have a particularly strong effect when used as a developer. For the purpose of the present invention any other suitable developer may be used, which exercises a preferred after treatment effect namely the tanning effect on the gelatine. In this case the exposure time for forming the screen may be reduced, to reach the same formation of the screen elements in the gelatine layer. The radius of curvature of the screen elements 10 and, thereby, the focus of the lens screen depend upon the exposure time in relation to the sensitivity of the gelatine layer 4 and upon the after treatment effect, namely the tanning effect, of the developer. Basically it may be stated that the screen elements 10 have a short focus upon long exposure time and a long focus upon short exposure time. Lens screens with short focus are generally preferable. For this reason, ordinarily a long exposure time is required. The exposure time may be shortened, however, if a developer is used which has a particularly strong after treatment effect, namely a tanning effect.

The screen plate is in usual manner subjected after development to a fixing bath and to watering. In the fixing bath the unexposed silver halide disposed between the blackening lines 7 is removed and the emulsion layer 5 is rendered transparent in these places, in that the lens screen assumes the shape shown in Figs. 2 and 3. Of course, the swelling of the gelatine layer 4 is not pressed to an indefinite degree. Rather the exposure time must be controlled in such manner, that after drying the radius of curvature of the individual cylinder lenses 10 assumes its focus on the picture layer 3. This may be achieved by providing a corresponding exposure range and by trial and error method.

The joints of each pair of adjacent cylinder lenses 10 are the product of exposure of the silver halide layer 5 and the silver halide emulsion admixed to the gelatine layer 4, respectively. Without these blackened and light absorbing joints 7, which stop the light rays for the exposure of the picture layer 3 (Fig. 3) during the following copying step, reflection errors and refraction errors would occur. In some cases they may be tolerated. The present invention includes, thus, also a material and a method of making the same, in which no blackened and light absorbing joints are formed.

The copying of the picture points 9 into the layer 3, as shown in Fig. 3, is achieved by stereo-geometrical exposures in series in known manner point by point, so that each picture point 9 corresponds over the entire copy face with a part of a stereo-picture.

Instead of using a plain screen 6 in the formation of the lens screen, a lens screen may be used through which upon exposure the individual focus points of the lenses may be projected onto the layer 5. In this manner it is possible to reduce appreciably the exposure time for the formation of the lens screen on the lens material 4. It is of course necessary to dispose the lens screen, substituted for the screen 6, at a distance from the layer 5 which distance is in proper relation to the focus of the lens screen.

The formation of a lens screen with point-shaped lenses, by example circular lenses, is basically achieved in the same manner as above described for a screen having elements of the shape of cylinder segments, and as clearly disclosed in Figs. 4 to 6.

The circular places marked 11 are the non-transparent portions of the copy-pattern, which places 11 are arranged in such manner relative to each other, that the transparent space between adjacent non-transparent portions is about ⅙ of the diameter of the circles. The pattern consists of a photographic layer, whereby the spaces between the non-transparent places 11 are clear.

A lens screen formed with the pattern shown in Fig. 3 is disclosed in sectional elevation and top plan view in Figs. 5 and 6, respectively.

The light sensitive layer 13, disposed on the glass carrier 14, is provided with spheric lens surfaces 15. Their curvature is preferably in dependance upon the exposure time during its formation measured in such manner, that the focus of each of the lenses are substantially in one plane which is disposed outside of the system. The material to be exposed is then disposed in this plane on which the points sharply appear upon projection.

While I have disclosed several embodiments of the present invention, it is to be understood that these embodiments are given by example only and not in a limiting sense, the scope of the present invention being determined by the objects and the claims.

I claim:

1. A method of forming a lens screen for photographic purposes, comprising the steps of exposing through a screen a photographic assembly of a layer of chromate light sensitized, tannable material selected from the group consisting of gelatin and cellulose hydrate, said layer carrying on its top surface a light sensitive thin silver halide stratum, said exposing step being performed through a negative of said screen to be formed, washing out said chromate without removing said tannable material and developing said silver halide stratum with a tanning developer, swelling the outer surface of said layer in order to prepare a lenticular outer surface with a formation of a lenticular screen and drying said layer.

2. A method of forming a lens screen for photographic purposes, comprising the steps of exposing through a screen a photographic assembly of a layer of chromate light sensitized, tannable material selected from the group consisting of gelatin and cellulose hydrate, said layer carrying on its top surface a first thin silver halide stratum, and on its opposite surface being in contact with a second silver halide layer, said exposing step being performed through a negative of said screen to be formed, washing out said chromate without removing said tannable material and developing said first silver halide stratum with a tanning developer, swelling the outer surface of said layer to prepare a lenticular outer surface with a formation of a lenticular screen, and drying said layer.

3. The method, as set forth in claim 1, wherein said tannable material consists of regenerated cellulose.

4. The method, as set forth in claim 1, wherein non-sensitized silver halide is incorporated throughout said material.

5. The method, as set forth in claim 2, which includes the step of copying picture points into said second silver halide layer through said lenticular screen.

6. The method, as set forth in claim 1, which includes the step of forming a top layer of said tannable material in valleys between each pair of adjacent convex lenses.

7. The method, as set forth in claim 1, which includes the step of admixing said tannable material in valley portions of said layer between each pair of adjacent convex lenses.

8. The method, as set forth in claim 1, which includes the step of applying said photographic assembly to a carrier of transparent material.

9. The method, as set forth in claim 1, which includes the step of applying said photographic assembly to a carrier of a material selected from the group consisting of glass and artificial resin.

10. The method, as set forth in claim 1, which includes the step of applying said photographic assembly to a carrier of opaque material.

11. The method, as set forth in claim 1, which includes the step of applying said photographic assembly to a carrier of paper.

12. The method, as set forth in claim 2, wherein said second silver halide layer comprises an emulsion of silver halide.

13. The product of the process, as set forth in claim 1.
14. The product of the process, as set forth in claim 2.
15. The product of the process, as set forth in claim 3.
16. The product of the process, as set forth in claim 4.
17. The product of the process, as set forth in claim 5.
18. The product of the process, as set forth in claim 6.
19. The product of the process, as set forth in claim 7.
20. The product of the process, as set forth in claim 8.
21. The product of the process, as set forth in claim 9.
22. The product of the process, as set forth in claim 10.
23. The product of the process, as set forth in claim 11.
24. The product of the process, as set forth in claim 12.

References Cited in the file of this patent

UNITED STATES PATENTS

| Number | Name | Date |
|---|---|---|
| 1,128,979 | Hess | Feb. 16, 1915 |
| 1,722,368 | Comstock | July 30, 1929 |
| 1,968,944 | Heymer | Aug. 7, 1934 |
| 1,980,443 | Schulte | Nov. 13, 1934 |
| 1,991,888 | Ernst | Feb. 19, 1935 |
| 2,182,993 | Moreno | Dec. 12, 1937 |
| 2,115,198 | Eggert et al. | Apr. 26, 1938 |
| 2,140,702 | Kanolt | Dec. 20, 1938 |
| 2,279,825 | Kaszab | Apr. 14, 1942 |
| 2,484,431 | Staehle et al. | Oct. 11, 1949 |
| 2,794,739 | Gretener | June 4, 1957 |
| 2,829,051 | Gretener | Apr. 1, 1958 |

OTHER REFERENCES

Mees: Theory of Photographic Process, Macmillan Co., pub., N. Y., 1942, pages 77–82 and 100–103.